United States Patent [19]

Friedman et al.

[11] Patent Number: 5,928,693

[45] Date of Patent: Jul. 27, 1999

[54] CLEAR COAT COMPOSITION FOR POTATO PRODUCTS AND METHOD OF MAKING

[75] Inventors: Robert Friedman, Chicago, Ill.; Eric Shinsato, Highland, Ind.; Robert Kerfin, Minneapolis, Minn.

[73] Assignee: Cerestar Holding B.V., Netherlands

[21] Appl. No.: 08/970,482

[22] Filed: Nov. 14, 1997

[51] Int. Cl.[6] .............................. A23B 7/16; A23L 1/522; A23L 1/216

[52] U.S. Cl. ..................... 426/102; 426/293; 426/549; 426/578; 426/637

[58] Field of Search ................................. 426/102, 293, 426/549, 578, 637

[56] References Cited

U.S. PATENT DOCUMENTS

| | | |
|---|---|---|
| 3,200,012 | 8/1965 | Hay . |
| 3,527,606 | 9/1970 | Taylor et al. . |
| 3,751,268 | 8/1973 | Van Patten et al. . |
| 4,790,997 | 12/1988 | Friedman et al. . |
| 4,792,458 | 12/1988 | Friedman et al. . |
| 5,035,912 | 7/1991 | Furcsik et al. . |
| 5,120,562 | 6/1992 | Furcsik et al. . |
| 5,141,759 | 8/1992 | Sloan et al. . |
| 5,260,076 | 11/1993 | Furcsik et al. . |
| 5,397,586 | 3/1995 | Furcsik et al. . |
| 5,648,110 | 7/1997 | Wu et al. . |
| 5,750,168 | 5/1998 | Woerman et al. . |

FOREIGN PATENT DOCUMENTS

94/21143   9/1994   WIPO .

*Primary Examiner*—Helen Pratt
*Attorney, Agent, or Firm*—Bierman, Muserlian and Lucas

[57] ABSTRACT

The clear coat composition for french fries is a combination of an acetylated starch, a dextrin, and a rice flour. The acetylated starch has an acetyl content of 1.5% to 2.5% and is made from a starch obtained from a plant having a genotype selected from the group consisting of dull sugary-2 and amylose extender dull. The dextrin has a solubility of 10% to 20% and is made from a starch having an amylose content below 35%. The coating allows for an extended period of time under a heat lamp.

20 Claims, 1 Drawing Sheet

CLEAR COAT COMPOSITION FOR POTATO PRODUCTS AND METHOD OF MAKING

BACKGROUND OF THE INVENTION

1. Field of the Invention

This invention relates to frozen, cut potato products, and, more specifically, a composition for clear coating cut potato products prior to freezing so as to prolong the life of the cut potato product once it has been fried and placed under a heat lamp.

2. Prior Art

The food service industry conventionally employs frozen cut potatoes which are subsequently fried and served as french fries. Before consumption, the french fries are typically placed under a heat lamp to keep warm. Although crisp when removed from the frier, the french fried potato loses its crispness when subjected to a heat lamp for a prolonged period of time. Additionally, both the texture and appearance of the french fried potato suffer due to exposure to the heat lamp.

In order to rectify this problem, cut potatoes are typically coated with a clear coat composition prior to freezing. The clear coat composition typically comprises water and a farinaceous component. The clear coat composition must not detract from the flavor or appearance after it has been fried. Examples of the farinaceous component used in clear coat compositions are taught in U.S. Pat. Nos. 3,751,268 (unmodified high amylose starch); 5,141,759 (a combination of chemically modified ungelatinized potato starch, chemically modified ungelatinized corn starch and rice flour); and in International Patent Application No. PCT/US94/02851 (a blend of wheat flour, modified corn or rice starch, corn or rice flour, a dextrin and a gum).

Oftentimes, these farinaceous components include a potato starch and a tapioca dextrin. Potato starch is often limited in commercial availability and usually commands a premium price. Tapioca starch is also often limited in supply and usually commands a premium price also. There is a need for a less expensive, more readily available clear coat composition for use on potato products which will protect the fried potato and allow the fried potato product to withstand the deleterious effects of a heat lamp.

SUMMARY OF THE INVENTION

It has been found that certain acetylated starches in combination with a low solubility dextrin and a rice flour can be used in a clear coat for french fries to prevent the deleterious effects of the heat lamp. The acetylated starch, dextrin and rice flour form a farinaceous component which is used in the clear coat for the cut potato product. The acetylated starch is made from a starch which is obtained from a starch bearing plant having a genotype selected from the group consisting of dull sugary-2 (dusu2), and amylose extender dull (aedu).

When the cut potato product is prepared by conventional processing procedures and coated with the clear coat composition of the present invention, it has been found that the eating quality of the fried potato product in terms of crispness is improved, while the natural appearance of the potato product is retained. It has also been found that the fried potato product made in accordance with the present invention can be held under a heat lamp without significant loss of crispness or increase in toughness and toothpack.

Broadly, the farinaceous component of the present invention used for making a clear coat composition for a cut potato product prior to cooking comprises:

(a) about 55% to about 85% by weight of an acetylated starch having an acetyl content of about 1.5% to about 2.5%, wherein said starch is obtained from a starch bearing plant having a genotype selected from the group consisting of dull sugary-2, amylose extender dull;

(b) about 5% to about 25% by weight of a dextrin having a solubility of about 10% to about 20%, wherein said dextrin is made from a starch having an amylose content less than about 35% by weight; and (c) about 5% to about 25% by weight of a rice flour.

Preferably, the farinaceous component comprises about 60% to about 80% by weight acetylated starch; about 5% to about 15% by weight dextrin; and about 10% to about 20% by weight rice flour.

More preferably, the farinaceous component comprises about 75% by weight acetylated starch; about 10% by weight dextrin; and about 15% by weight rice flour. The weight percents for the farinaceous component are based on the total weight of the three components in the composition, wherein their total weight adds up to 100%.

A clear coat composition made in accordance with the present invention comprises water and an effective amount of the farinaceous component of the present invention. Preferably, the clear coat composition comprises about 30% to about 45% by weight farinaceous component; and, more preferably, about 40% by weight farinaceous component, the remainder being water. These percents are based on the total weight of the clear coat composition.

The clear coat composition can also contain other ingredients such as seasoning or flavoring ingredients. Preferably, the clear coat composition contains no more than about 10% of these other ingredients. The preferred other ingredients are salt, sodium aluminum phosphate, and sodium bicarbonate.

In order to prepare the coated potato product, the cut potatoes are prepared in a conventional manner and then dipped into the clear coat composition of the present invention. In the case of frozen potato products, the cut potato product is coated with the clear coat composition prior to freezing.

BRIEF DESCRIPTION OF THE INVENTION

FIG. 1 illustrates the crispness of a french fry made in accordance with the present invention to a conventional product.

DETAILED DESCRIPTION OF THE INVENTION

Figure 1:
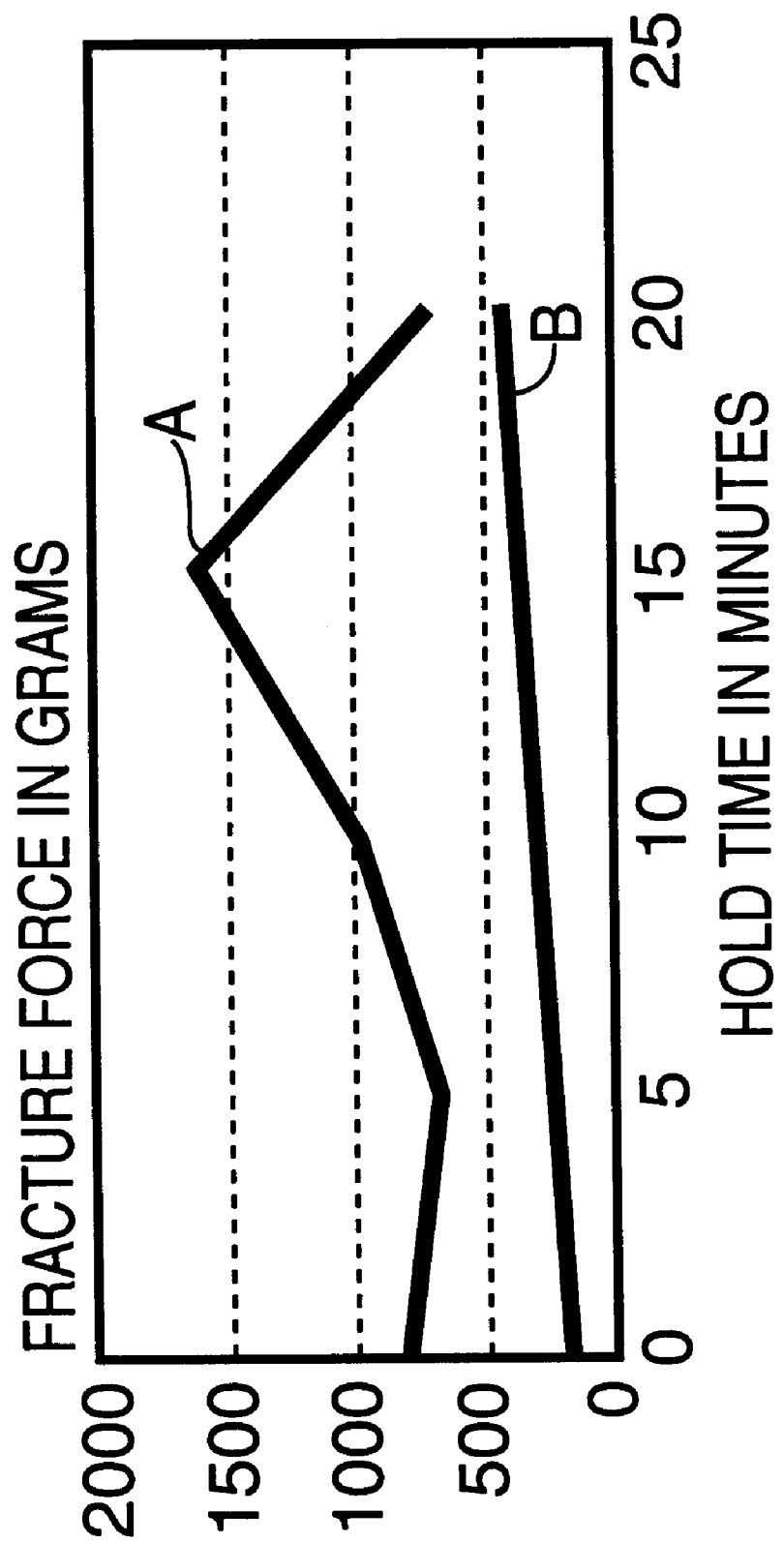

Any plant source which produces edible starch and which can be bred to produce a plant having an aedu, or a dusu2 homozygous genotype may be used to obtain the starches which are used to make the acetylated starch in accordance with the present invention. It has been found that the amylose extender (ae) gene is present in maize and barley, and that cereal grains such as maize contain the dull (du), and sugary-2 (su2) genotypes. Maize (corn) is the preferred plant source for the starches used in the present invention.

The terms "amylose extender dull" or "aedu" genotype as used in the specification and claims mean not only the aedu homozygous genotype, aeaedudu, which has been obtained by standard plant breeding techniques, but also the aedu genotype which has been moved to another portion of the plant genome by translocation, inversion, or any other method of chromosome engineering to include variations thereof whereby the disclosed properties of the starch used in the present invention are obtained. The use of starches from plants with the amylose extender dull genotype is taught in U.S. Pat. Nos. 5,497,586; 5,260,076; 5,120,562; 5,035,912; and 4,790,997. It is noted that the '562 patent teaches a batter mix containing acetylated aedu starch with a protein content of greater than or equal to 1%. The '562 patent does not teach the use of a dextrin or rice flour and the batter mix of the '562 patent does not work as well on french fries as the batter mix of the present invention.

The terms "dull sugary-2" or "dusu2" genotype as used in the specification and claims mean not only the dusu2 homozygous genotype, dudusu2su2, which has been obtained by standard plant breeding techniques, but also the dusu2 genotype which has been moved to another portion of the plant genome by translocation, inversion, or any other method of chromosome engineering to include variations thereof whereby the disclosed properties of the starch used in the present invention are obtained. The use of starches from plants with a genotype dull sugary-2 is disclosed in U.S. Pat. Nos. 4,792,458 and 5,260,076.

The terms "aedu starch" and "dusu2 starch" as used in the specification and claims mean starches obtained from starch-bearing plants which are of the aedu and dusu2 genotypes, respectively. The preferred starch for use in the present invention is dusu2 starch.

Acetylation of the starch granule is conducted in an aqueous medium in a conventional manner to obtain the appropriate acetyl content. Appropriate acetylating agents include vinyl acetate and acetic anhydride, the preferred acetylating agent is acetic anhydride. Suitable catalysts are sodium hydroxide, calcium hydroxide and sodium carbonate, calcium hydroxide is preferred.

The acetylated starch of the present invention has an acetyl content of about 1.5% to about 2.5% and, more preferably, about 2.5%. The acetyl content is measured as a percent by weight of acetyl groups based on the total weight of the acetylated starch. Acetyl content is determined in a conventional manner using The Standard Analytical Method C-2 Corn Refiners Association.

In order to acetylate the starch granules, a slurry of starch is prepared having about 5 to about 40% by weight starch and, more preferably, 30% to 35%. The pH of the slurry is then adjusted to about 8 to about 11. Preferably, the pH of the slurry is adjusted by the addition of calcium hydroxide, which is mixed thoroughly with the starch granules for about 30 minutes. Next, an acetylating agent is added to the slurry. The acetylating agent is added quickly while maintaining the pH of the slurry. The preferred acetylating agent, acetic anhydride, is added to the slurry in an amount to obtain the desired acetyl content. The reaction is continued for about 0.1 to about 1.0 hours at about 80° F. (25° C.) to about 120° F. (50° C.). Once the reaction is completed to the desired acetyl content, the pH slurry is adjusted to about 5 to about 6, diluted with water, dewatered, washed and dried.

The dextrin is made from a starch that has an amylose content of less than about 35% by weight and, more preferably, about 25–30% by weight. Suitable sources for the starch used to make the dextrin include potato, cassava (tapioca), rice, corn, wheat, sorghum and milo. The starch can be a waxy starch, a root starch, or a common cereal starch, provided the amylose content of the starch is below about 35%. The preferred plant source for the starch used to make the dextrin is maize and the preferred starch is common corn starch.

The dextrin used in the present invention is a pyrodextrin, i.e. one made by a process of pyroconversion. Historically, such dextrins were referred to as either British gums, white dextrins, or yellow or canary dextrins, depending on their degree of conversion. In order to make a pyrodextrin in accordance with the present invention, a starch containing about 12.0% moisture by weight is sprayed with a dilute solution of an acid such as hydrochloric acid and heated to a temperature between about 200° F. (95° C.) and about 360° F. (185° C.) or more for a period of time that may range from two to ten and more hours to obtain the desired degree of degradation. The amount of acid and the temperature are determined by the desired product. As a practical matter, degradation of the starch is carried out to the extent that about 10% to about 20% by weight of the dextrinized starch is soluble in water. The acid customarily used is hydrochloric acid which is sprayed on the dry starch in an amount of up to about 0.04% by weight of starch. Higher amounts of hydrochloric acid may be used in a conventional manner. Besides hydrochloric acid, other suitable catalysts for use in converting the starch to a dextrin include nitric acid, monochloroacetic acid, phosphoric acid, and chlorine. Hydrochloric acid, however, is preferred. The amount of acid used is such to bring the pH of the starch to about 3.0. Other known conventional catalysts such as sodium bicarbonate, sodium phosphate or chlorine gas at a neutral or alkaline pH may be employed as a catalyst in the conversion step.

Any of the conventional roasting apparatus may be used such as the bulk cookers, fluidized bed dextrinizers or kiln type cookers. U.S. Pat. No. 3,200,012 describes one form of cylindrical drum roaster and U.S. Pat. No. 3,527,606 describes a paddle type roaster which may be conveniently employed for dextrinizing the starch. Roasting temperature may range from about 200° F. (95° C.) up to 350° F. (185° C.) and more depending on the type of roaster employed for a period of time of from about 2 up to about 10 hours to obtain a dextrin of desired solubility. The solubility of the dextrin of the present invention is about 10% to about 20% by weight; preferably about 10% to about 15% by weight and, more preferably, about 12% to about 15% by weight. Solubility is determined in a conventional manner by adding the dextrin to water at about 75° F. (24° C.) and stirring to form a slurry.

Any conventional rice flour can be used in the present invention. Suitable types of rice flour include RL100 sold by Rivland Partnership, Comet Rice Ingredients Company, and Pacific Grain Products Inc. RL100 is the preferred source of rice flour.

In order to prepare the clear coat composition in accordance with the present invention, the farinaceous component is mixed with water. Good results have been obtained by mixing the water into the farinaceous component but any conventional procedure can be employed.

In order to prepare a coated, frozen potato product in accordance with the present invention, raw potatoes are washed, peeled, cut into strips, blanched and dipped in a brine solution and then air dried. The potato strips are then coated with the clear coat composition of the present invention. Next, the coated potato strips are prefried for a short period of time (195° C. for 30 seconds) and then frozen.

To cook the frozen coated potato strips, they are removed from the freezer and cooked in a conventional manner, e.g. fried.

These and other aspects of the present invention may be more fully understood by reference to one or more of the following examples.

EXAMPLE 1

This example illustrates making an acetylated dusu2 starch in accordance with the present invention.

A slurry of a dusu2 starch is prepared at a solids content of 30%. Lime is added at 3.3% by weight dry starch. The starch is soaked for 30 minutes and then acetic anhydride in an amount of 8.8% based on weight of dry starch is added to the slurry while the slurry is under high agitation. The reaction is allowed to proceed for 15 minutes, at which time the pH is adjusted to about 5 to about 6. The slurry is then diluted with an equal amount of water, dewatered and dried. The resulting starch had an acetyl content of 2.5%.

EXAMPLE 2

This example illustrates making a dextrin in accordance with the present invention.

Common corn starch (28% amylose) was treated with gaseous hydrochloric acid to bring the pH of the starch to about 2.7 to about 2.8. The acidified starch was then slowly heated in a steam heated horizontal blender/reactor. Once the temperature of the starch reached 200° F. (95° C.) samples were taken to determine the solubility levels. Heating was continued until it reached 240° F. (215° C.) at which time the temperature was maintained. Once the solubility reached the range of 10% to 20%, the reaction was terminated by dropping the starch out of the reactor and into a cooler. Ammonium bicarbonate was added to the cooling starch to neutralize the acid and adjust the pH. The amount of bicarbonate added was about 0.03% by weight starch. The final solubility of the dextrin was 15%.

EXAMPLE 3

This example teaches making a clear coat composition, a coated, frozen potato product, and a french fry in accordance with the present invention using acetylated dusu2 starch.

The following dry composition was mixed together:

| Ingredients | Percent |
| --- | --- |
| Acetylated dusu2 starch | 68.0 |
| Rice flour | 15.0 |
| Common corn dextrin | 10.0 |
| Salt (NaCl) | 6.0 |
| Sodium aluminum phosphate | 0.5 |
| Sodium bicarbonate | 0.5 |
| | 100.0 |

The acetylated dusu2 was the one prepared in Example 1 while the dextrin was the one prepared in Example 2. The rice flour was Rivland's RL100 while the phosphate was Monsanto's Pan-O-Lite and bicarbonate was Church and Dwight's USP #1 grade.

The potatoes were washed, peeled and cut into 5/16 inch (0.8 cm) slices. Next, the potato slices were blanched at 170–180° F. (75–85° C.) for five minutes and then dipped into a solution of water and 0.05% sodium acid pyrophosphate. The potato slices were then dried in a convection oven at 200° F. (95° C.) for ten minutes.

The clear coat composition was prepared by dry blending the ingredients and then adding water to the dry blend in an amount of about 1.6 parts water to 1.0 parts dry mix by weight.

The potato slices were then dipped into the clear coat composition to obtain a pick up of about 14–16%. The coated potato slices were then prefried at 380° F. (195° C.) for 30 seconds and, finally, frozen at 0° F. (−20° C.).

The frozen product was fried at 350° F. (175° C.) for 2.5 minutes to produce a french fried potato. This initial product was taste tested by a taste panel.

The french fried potatoes were then placed under a heat lamp for 20 minutes and the heat lamp product was tested by the taste panel. The panel found no difference between the initial product and the heat lamp product.

EXAMPLE 4

This example teaches making a clear coat composition, a coated, frozen potato product, and a french fry in accordance with the present invention using acetylated aedu starch.

The following dry composition was mixed together:

| Ingredients | Percent |
| --- | --- |
| Acetylated aedu starch | 68.0 |
| Rice flour | 15.0 |
| Common corn dextrin | 10.0 |
| Salt (NaCl) | 6.0 |
| Sodium aluminuin phosphate | 0.5 |
| Sodium bicarbonate | 0.5 |
| | 100.0 |

The acetylated aedu was prepared in the same manner as Example 1, except aedu starch was substituted for the dusu2 starch. The dextrin was the one prepared in Example 2. The rice flour was Rivland's RL100 while the phosphate was Monsanto's Pan-O-Lite and bicarbonate was Church and Dwight's USP #1 grade.

The potatoes were washed, peeled and cut into 5/16 inch (0.8 cm) slices. Next, the potato slices were blanched at 170–180° F. (75–85° C.) for five minutes and then dipped into a solution of water and 0.05% sodium acid pyrophosphate. The potato slices were then dried in a convection oven at 200° F. (95° C.) for ten minutes.

The clear coat composition was prepared by dry blending the ingredients and then adding water to the dry blend in an amount of about 1.6 parts water to 1.0 parts dry mix by weight.

The potato slices were then dipped into the clear coat composition to obtain a pick up of about 14–16%. The coated potato slices were then prefried at 380° F. (195° C.) for 30 seconds and, finally, frozen at 0° F. (−20° C.).

The frozen product was fried at 350° F. (175° C.) for 2.5 minutes to produce a french fried potato. This initial product was taste tested by a taste panel.

The french fried potatoes were then placed under a heat lamp for 20 minutes and the heat lamp product was tested by the taste panel. The panel found no difference between the initial product and the heat lamp product.

EXAMPLE 5

This example compares the clear coat composition of the present invention with a clear coat composition made with a conventional high amylose starch.

Two samples of frozen cut potato products were prepared in the same manner as taught in Example 3 above using the following two dry compositions to make up a clear coat composition which was used to coat the cut potato product.

|  | Percents | |
| --- | --- | --- |
| Ingredients | Present Invention | Comparative |
| Acetylated dusu2 corn starch (2.5%) | 68 | — |
| Acetylated high amylose corn starch (2.50%) | — | 68 |
| Rice flour | 15 | 15 |
| Common corn dextrin | 10 | 10 |
| Salt (NaCl) | 6.0 | 6.0 |
| Sodium aluminum phosphate | 0.5 | 0.5 |
| Sodium bicarbonate | 0.5 | 0.5 |

French fries were prepared from the frozen potato product in the same manner as taught in Example 3 above.

The fried product was then tested with a Stevens Texture Analyzer to determine the fracture force versus the hold time under a heat lamp. The data from these tests is illustrated in the graph in FIG. 1.

The coating graph in FIG. 1 illustrates that a french fry coated with the clear coat composition of the present invention marked Graph A required more force to break the clear coat on the french fry than a french fry coated with a clear coat composition containing a conventional acetylated high amylose starch marked Graph B. In other words, the present invention results in a higher level of crispness than a conventional product.

The Stevens Texture Analyzer was operated in a conventional manner using a flat nosed blade to test the strength of coating on the french fry. The blade employed was approximately 2 mm in width. The french fries were held under a conventional food service heat lamp which was spaced about 1 foot above the french fries. French fries were removed at five minute intervals starting at time 0 (when they were first placed under the heat lamp) and tested to determine the amount of force, in grams, necessary to cut through the coating of the french fry.

It will be understood that the claims are intended to cover all changes and modifications of the preferred embodiments of the invention herein chosen for the purpose of illustration which do not constitute a departure from the spirit and scope of the invention.

What is claimed is:

1. A farinaceous component for use in a clear coat composition for coating a potato product prior to cooking comprising:
   (a) about 55% to about 85% by weight of an acetylated starch having an acetyl content of about 1.5% to about 2.5% by weight, and made from a starch obtained from a plant having a genotype selected from the group consisting of dull sugary-2 and amylose extender dull;
   (b) about 5% to about 25% by weight dextrin having a solubility of about 10% to about 20%, and made from a starch having an amylose content less than about 35% by weight; and
   (c) about 5% to about 25% by weight of a rice flour.

2. The farinaceous component of claim 1 wherein said acetylated starch is present in an amount of about 60% to about 80% by weight, is made from a starch obtained from maize having a genotype of dull sugary-2, and has an acetyl content of about 2.5%.

3. The farinaceous component of claim 1 wherein said dextrin is present in an amount of about 5% to about 15% by weight, is made from a common corn starch, and has a degree of solubility of about 10% to about 15%.

4. The farinaceous component of claim 1 wherein said rice flour is present in an amount of about 10% to about 20% by weight.

5. The farinaceous component of claim 1 wherein
   (a) said acetylated starch is present in an amount of about 75% by weight, is made from a starch obtained from maize having a genotype of dull sugary-2, and has an acetyl content of about 2.5%;
   (b) said dextrin is present in an amount of about 10% by weight, is made from a common corn starch, and has a degree of solubility of about 12% to about 15%; and
   (c) said rice flour is present in an amount of about 15% by weight.

6. A clear coat composition for coating a potato product prior to freezing comprising:
   (a) water; and
   (b) an effective amount of a farinaceous component comprising:
      ($b_1$) about 55% to about 85% by weight acetylated starch having an acetyl content of about 1.5% to about 2.5% by weight, and made from a starch obtained from a plant having a genotype selected from the group consisting of dull sugary-2 and amylose extender dull;
      ($b_2$) about 5% to about 25% by weight dextrin having a solubility of about 10% to about 20%, and made from a starch having an amylose content less than about 35% by weight; and
      ($b_3$) about 5% to about 25% by weight of a rice flour.

7. The clear coat composition of claim 6 wherein said acetylated high amylose starch is present in the farinaceous component in an amount of about 75%, is made from a starch obtained from maize that has a genotype of dull sugary-2 and has an acetyl content of about 2.5%.

8. The clear coat composition of claim 7 wherein said dextrin is present in said farinaceous component in an amount of about 10%, is made from a common corn starch, and has a degree of solubility of about 12% to about 15%; and said rice flour is present in said farinaceous component in an amount of about 15%.

9. The clear coat composition of claim 6 further comprising seasonings and preservatives.

10. The clear coat composition of claim 6 wherein the amount of said farinaceous component present in said clear coat composition is about 40% by weight of said clear coat composition.

11. A frozen potato product which has been coated with a clear coat composition prior to freezing wherein said clear coat composition contains as an essential ingredient therein a farinaceous component comprising:
   (a) about 55% to about 85% by weight of an acetylated starch having an acetyl content of about 1.5% to about 2.5% by weight and made from a starch obtained from a plant having a genotype selected from the group consisting of dull sugary-2 and amylose extender dull;
   (b) about 5% to about 25% by weight dextrin having a solubility of about 10% to about 20% and made from a starch having an amylose content less than about 35% by weight; and
   (c) about 5% to about 25% by weight rice flour.

12. The frozen potato product of claim 11 wherein said acetylated starch is present in said farinaceous component in an amount of about 75% by weight, is made from a starch obtained from maize that has a genotype of dull sugary-2 having an acetyl content of 2.5%.

13. The frozen potato product of claim 12 wherein said dextrin is present in said farinaceous component in an amount of about 10%, is made from a common corn starch, and has a degree of solubility of about 12% to about 15%; and said rice flour is present in said farinaceous component in an amount of about 15%.

14. The frozen potato product of claim 11 wherein said clear coat composition further comprises seasoning or flavoring ingredients.

15. The frozen potato product of claim 14 wherein said seasoning or flavoring ingredients comprise salt, sodium aluminum phosphate, and sodium bicarbonate.

16. A method for making a clear coat composition for coating a potato product prior to freezing comprising:
   (a) forming a farinaceous component comprising:
      (a1) about 55% to about 85% by weight of an acetylated starch having an acetyl content of about 1.5% to about 2.5% by weight, and made from a starch obtained from a plant having a genotype selected from the group consisting of dull sugary-2 and amylose extender dull;
      (a2) about 5% to about 25% by weight dextrin having a solubility of about 10% to about 20%, and made from a starch having an amylose content less than about 35% by weight;
      (a3) about 5% to about 25% by weight of a rice flour; and
   (b) mixing water with an effective amount of said farinaceous component to form a clear coat composition for coating a potato product.

17. The method of claim 16 wherein the amount of said farinaceous component is about 30 to 45% by weight of said clear coat composition.

18. A method for preparing a frozen potato product comprising:
   (a) coating a potato product with a clear coat composition comprising:
      (a1) about 55% to about 85% by weight of an acetylated starch having an acetyl content of about 1.5% to about 2.5% by weight, and made from a starch obtained from a plant having a genotype selected from the group consisting of dull sugary-2 and amylose extender dull;
      (a2) about 5% to about 25% by weight dextrin having a solubility of about 10% to about 20%, and made from a starch having an amylose content less than about 35% by weight;
      (a3) about 5% to about 25% by weight of a rice flour; and
   (b) freezing said coated potato product.

19. The method of claim 18 wherein after coating but before freezing, said coated potato product is prefried for about 30 seconds.

20. The method of claim 19 wherein said coating is accomplished by dipping said potato product into said clear coat composition.

* * * * *